E. J. BLAKE.
SYSTEM OF TRAIN CONTROL.
APPLICATION FILED MAR. 11, 1919.
1,381,698.
Patented June 14, 1921.
2 SHEETS—SHEET 1.
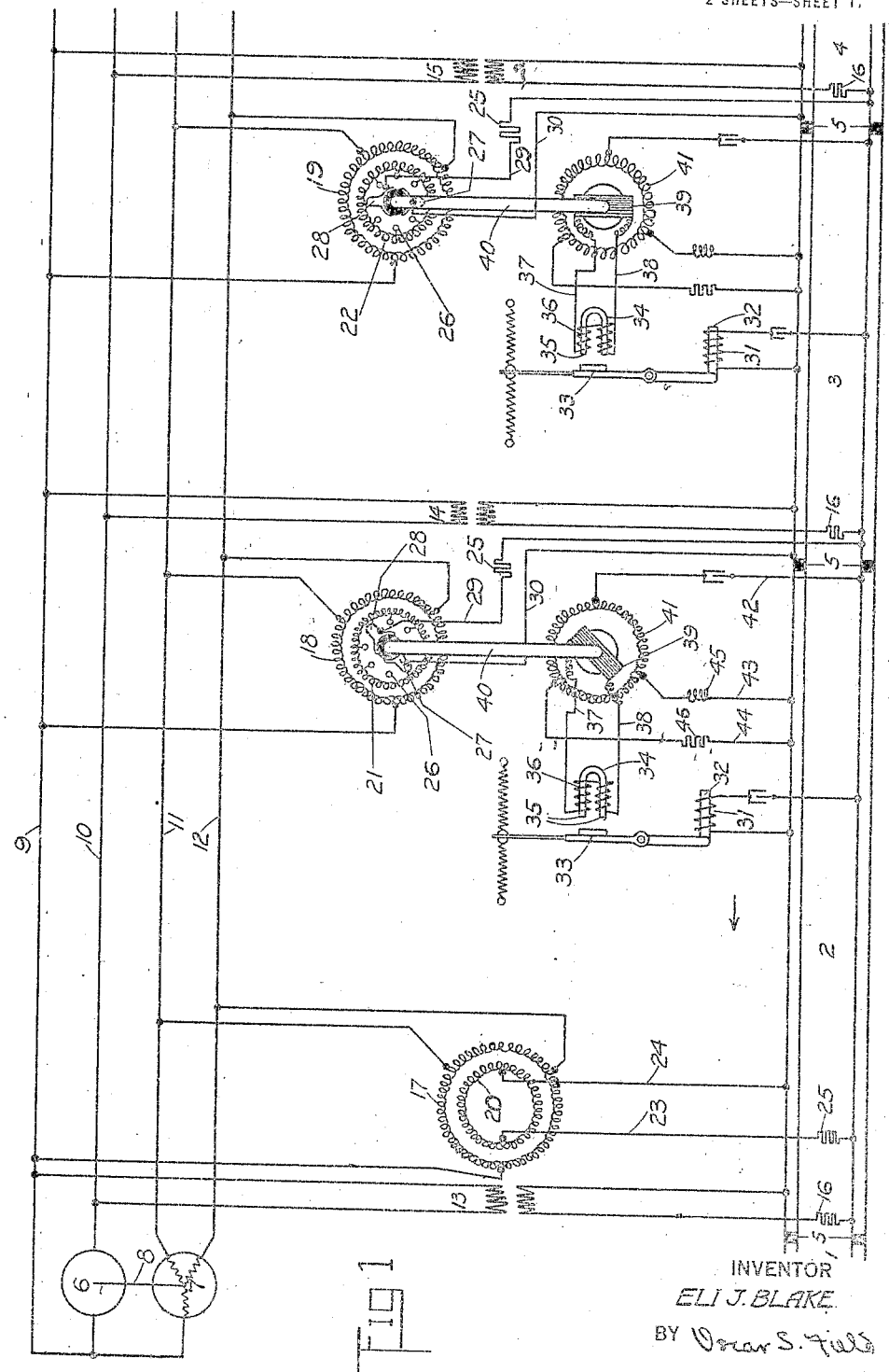
INVENTOR
ELI J. BLAKE.
BY Oscar S. Field
ATTORNEY E. J. BLAKE.
SYSTEM OF TRAIN CONTROL.
APPLICATION FILED MAR. 11, 1919.
1,381,698.
Patented June 14, 1921.
2 SHEETS—SHEET 2.
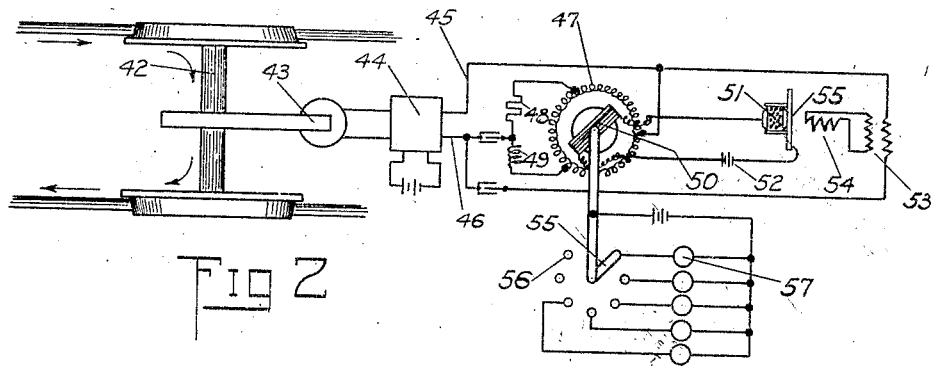
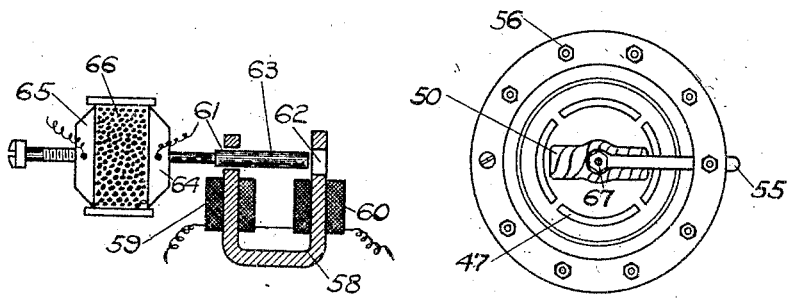
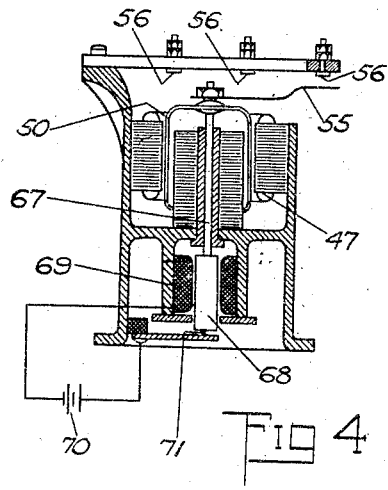
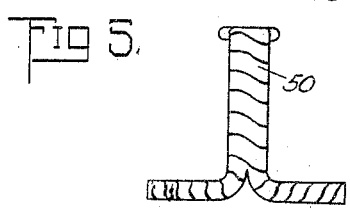
INVENTOR
ELI J. BLAKE
BY Oscar S. Field
ATTORNEY

UNITED STATES PATENT OFFICE.

ELI J. BLAKE, OF BUFFALO, NEW YORK, ASSIGNOR TO HALL SWITCH & SIGNAL CO., A CORPORATION OF MAINE.

SYSTEM OF TRAIN CONTROL.

1,381,698.  Specification of Letters Patent.  Patented June 14, 1921.

Application filed March 11, 1919. Serial No. 282,014.

*To all whom it may concern:*

Be it known that ELI J. BLAKE, a citizen of the United States, residing in Buffalo, in the county of Erie and State of New York, whose post-office address is care of Gould Coupler Company, Depew, New York, has invented certain new and useful Improvements in Systems of Train Control, of which the following is a specification.

The present invention comprises an inductive system of train control wherein a multitude of different signals or different controls may be obtained from the track. I have disclosed in my copending application Serial #135,120, an inductive system of the same general character as the system herein disclosed and it is the object of the present system to provide means for obtaining a multiplicity of various indications on the moving vehicle. Broadly the invention consists in supplying a track circuit with two sources of alternating current of frequencies of commensurate ratios, the phase displacement of these frequencies being varied in order to obtain different indications on the vehicle. These frequencies are inductively collected by means of a device located on the vehicle and are then brought to a common frequency whereby they may be caused to operate a receiving device which is responsive to the phase relation of the two sources of energy.

In the accompanying drawings and description I have disclosed certain means and devices for accomplishing these purposes.

I do not wish to be restricted to the particular means disclosed as it is obvious that other devices may be employed in a number of instances without departing from the spirit of the broad invention.

Figure 1 is a diagrammatical representation of the running track equipped with the necessary apparatus to accomplish the foregoing purposes.

Fig. 2 is a diagram showing the apparatus on the moving train or vehicle.

Fig. 3 diagrammatically shows one form of frequency changing device.

Fig. 4 shows a plan and section of a relay which is responsive to phase relation of the two alternating currents.

Fig. 5 is a plan and side elevation of the moving winding employed in Fig. 4.

It will be seen that there are broadly two distinct parts to the invention, one comprising the track apparatus, and the other comprising the apparatus which is placed on the moving vehicle. It will further be seen that the track apparatus may be used for the control of roadside signals where desirable.

Referring to Fig. 1 I show a track divided into blocks 1, 2, 3, and 4 respectively by means of suitable insulating joints 5. I have also diagrammatically shown two alternating current generators 6 and 7 mechanically connected together by means of a shaft 8 and driven by any suitable extraneous source of power, not shown. It will be seen that as these generators are mechanically connected the frequency of one generator will always have a definite relation to the frequency of the other generator.

For the purpose of the present disclosure we will assume that generator 6 produces a current of 25 cycle frequency and generator 7 produces a current of 50 cycle frequency. Generator 7 is a 3 phase generator. Generators 6 and 7 are connected to a common conductor 9 and generator 6 is provided with a line wire 10, generator 7 being provided with two line wires 11 and 12 in order to carry the alternating currents to desired points along the track. At the exit end of each track section 25 cycle current from the generator 6 is fed to the running rails by means of transformers 13, 14, 15 etc. respectively. It will be understood, in the sequel, that although the apparatus attached to three successive blocks has been described, the other blocks of system may be similarly equipped. The secondary circuit of these transformers across the track is provided with a resistance 16 in order to prevent excessive flow of current to the track and also to prevent the transformers shunting currents from other sources of energy connected across the track. Connections are taken from common 9 and lines 11 and 12 to primary windings of ring core transformers 17, 18 and 19 at the exit end of each track section respectively, the primary windings being provided with polyphase connections in a manner well-known in the art. The transformers 17, 18 and 19 are each provided with windings 20, 21 and 22 respectively, forming the secondary windings of these transformers. The winding 20 of transformer 17 is connected by means of leads 23 and 24 to the exit end of track section 2 as shown, resistance 25 being inserted in this connection for the same purpose as the resistance 16 previously described. The windings 21 and 22 of the transformers of sections 3 and 4 are provided with a series of taps 26 and further provided with co-acting contact fingers 27 and 28 which are adapted to be rotated to make connections with the various taps 26 of the coils 21 and 22 respectively. By taking current from different pairs of these taps 26, the phase of the 50 cycle current may be varied at will. The contact fingers 27 and 28 are connected by means of leads 29 and 30 to the exit ends of their respective track sections through suitable resistances 25.

It will be seen from the above that each track section which is to be controlled is fed with a constant supply of energy from the 25 cycle circuit, and, by means of the ring core transformers they are fed with 50 cycle energy at a definite phase relation to the 25 cycle energy in accordance with the position of contact fingers 27 and 28.

Fig. 2 is merely the entering block or the commencement of the section which is to be placed under control. This being so, it will be obvious that this block is fed with constant sources of energy which are not variable as to phase displacement. It is also obvious that a train in this block will be out of the control of the territory, but will have the effect of controlling a vehicle which may be traveling in block 3. At the entrance end of each track section a winding 31 is bridged across the rails and is given such characteristics that it will respond to the 25 cycle frequency in the track, causing the solenoid 32 to be vibrated at double the frequency of the 25 cycle current due to the solenoid responding individually to each wave of the alternating current irrespective of the polarity of the same. This will cause an armature 33 to be vibrated adjacent to poles of permanent magnet 34 which will vary the intensity of flux in the extended pole pieces 35. The pole pieces 35 are provided with windings 36 and it will be seen that the variation in flux in these pole pieces will generate an alternating current in the coils 36 of substantially 50 cycles frequency. This current is carried by means of leads 37 and 38 to a rotatable winding 39 which comprises the moving element of a dynamometer type of relay. This winding 39 is mechanically connected by means of shaft 40 to the contact fingers 27 and 28 of the 50 cycle transformers in such a manner that the contact fingers 27 and 28 will assume a position corresponding to the position of the winding 39. The polyphase stationary winding 41 is adapted to surround the moving coil 39 and is fed from its respective track section by means of common lead 42 and return leads 43 and 44 which are provided with phase-splitting reactance and resistance 45 and 46 respectively.

It will be seen from the above that at the entrance end of section 2 the dynamometer moving coil 39 will assume a definite position in accordance with the phase relation of the 50 cycle current in the track and the 50 cycle current which has been regenerated from the 25 cycle current in the track. The position of coil 39 will determine the position of contact fingers 27 and 28 of the ring core transformer which feeds 50 cycle current to track section 3. As shown in the figure this position is displaced a definite number of degrees to that of ring core transformer 17 thereby changing the phase relation of the 50 cycle current to the 25 cycle current in track section 3 accordingly. On account of the changed phase relation of the 50 cycle current in section 3 of the dynamometer moving coil 39 of this section will have been displaced a further number of degrees, changing the phase relation of the 50 cycle current being fed to the track section 4 a further corresponding number of degrees. It will be seen that this process can be repeated a number of times through the track section until the entire possible angle of displacement between the 25 and 50 cycle sources of energy has been exhausted, and it will further be seen that we have an electrical condition in the track where each succeeding block is fed with 25 and 50 cycle current but which varies in the number of degrees displacement in each block. It is this displacement between the phase angle of the 25 and 50 cycle current which is used for selectively controlling the apparatus on the car which is traveling along the track and which will hereafter be described.

It is further obvious that this phase displacement may be controlled by means, extraneous to the track circuit control, where it is desired to obtain a special control of the train, such as at interlocking plants, drawbridges, etc.

It will be seen from the foregoing that if each of the dynamometer movements are biased to assume a definite position when they are deënergized, that the presence of a train across any section of track will cause the dynamometer movement in that section to be deënergized by shunting out the energy from the same in the well-known manner as employed in track circuit signals, and that this particular movement will assume its biased deënergized position, and that each succeeding movement in the track section at the rear of the train will be stepped up a definite number of degrees until the maximum number of degrees is reached when each succeeding dynamometer movement beyond that point will be at its maximum position due to the current being fed to these succeeding movements at its maximum phase displacement. This result is accomplished by the relative position of the coil and the contacts on the dynamometer movement being such that when one movement has operated to its maximum position it will furnish current of the same phase displacement to the movement in the rear, thereby causing all subsequent movements to likewise assume the maximum angle of movement. Under these conditions it will be seen that means is provided whereby graduated indications are given for a definite number of sections behind a moving vehicle which may represent permissible speeds of travel. It will be obvious that any number of indications may be thus obtained up to the maximum possible phase displacement between the two frequencies, the only controlling feature being the fineness with which the apparatus may be designed to obtain effective operative changes between the steps taken and the phase displacement.

Referring to Fig. 2 I have here shown diagrammatically apparatus on the vehicle which is adapted to be operated by the various relative phase displacements of the 25 and 50 cycle energy in the track to give various signals on the vehicle or control the same in any desired manner in accordance with the phase displacement of the two frequencies. In order to accomplish this purpose I have provided about the axle 42 of the vehicle a transformer 43 which is adapted to pick up the 25 and 50 cycle energy from the track, said energy being amplified by means of an amplifier of any well-known construction 44 in order to provide enough energy on the vehicle to operate the apparatus. This method of collection of energy is more fully described and disclosed in my above referred to application Serial #135,120.

It will be obvious from the foregoing that across the leads 45 and 46 on the output side of the amplifier 44 we will have an alternating current which is composed of the components of a 25 cycle and 50 cycle current at some definite phase relation which has been determined by the energy in the track. A polyphase dynamometer movement is provided on the vehicle having a polyphase winding 47 which is fed through phase-splitting resistance and reactance 48 and 49 from the leads 45 and 46. It will be obvious that the winding 47 is receiving energy composed of currents of 25 and 50 cycle frequencies. However, this circuit is so tuned as to substantially eliminate the 25 cycle component. A moving coil 50 is provided being connected through a suitable variable resistance 51 and a source of energy 52. Across the leads 45 and 46 is provided a transformer 53 which is adapted to energize a winding 54 to cause a suitable armature 55 to oscillate. It will be seen that the oscillation of this member 55 will be in response to the 25 and 50 cycle components in the circuit but will be of double the frequency due to the absence of polarity of the member 55. This will cause the member 55 to fluctuate, and the fluctuations will have the characteristics of substantially 50 and 100 cycle frequencies superimposed. This circuit is also tuned to eliminate the majority of the 100 cycle frequency.

From the foregoing it will be seen that in the polyphase winding 47 we have a frequency of 25 and 50 cycles and in the moving winding 50 we have a frequency of 50 and 100 cycles, and it will be evident in view of polyphase connections of winding 47 that the 50 cycle frequency in the windings 47 and 50 will cause the winding 50 to assume a definite angle of rotation which will be in direct relation to the phase relation of the original 25 and 50 cycle frequency currents collected from the running rails. By causing the coil 50 to control a suitable contact member 55 we may cause various contacts 56 to be closed to operate any desirable controlling or signal mechanisms 57 to give us the necessary control of the vehicle. If we assume that the members 57 comprise devices on the vehicle which would restrict the speed of the vehicle to a certain definite limit, it will be seen that we have obtained speed control of the vehicle in accordance with the energy conditions in the track and by varying these energy conditions we can vary the permissible speed of travel of the vehicle. Member 57 might further comprise various signal indications such as siding signals or interlocking signals of any desirable location.

In Fig. 3 I have shown one form of device which may be used for stepping up the frequency of the low frequency current. This comprises a soft iron core 58 upon which are windings 59 and 60 respectively. The pole pieces of these cores are provided with holes 61 and 62 as shown and core 63 is adapted to pass through the same. Attached to the core 63 is a contact stud 64 and a contact stud 65 is provided which is adapted to face contact stud 64 between which is placed a layer of carbon granules 66. It will be seen that as the 25 cycle alternating current passes through the coils 59 and 60 it will cause the core 63 to oscillate, this core being drawn into the hole 62 of pole piece 58 with each oscillation of the current irrespective of the polarity of the same. It will therefore be seen that the core 63 will be moved backward and forward at a frequency of double the frequency of the alternating current. This will vary the pressure on the carbon granules 66 at the same rate, causing a circuit to pass through the same to oscillate at twice the frequency of the original current.

Fig. 4 shows one means of construction of a dynamometer element which is adapted to respond to the phase displacement of the alternating currents. The moving coil 50 more clearly shown in Fig. 5 is mounted in a freely rotatable shaft 67 and is adapted to swing in the field of the polyphase winding 47. Contact finger 55 is rigidly attached to the coil and is adapted to rotate therewith in operative proximity to the contact stud 56. In order to make this member free to move without undue friction, I have provided at the lower end of the spindle 67 a solenoid plunger 68. This plunger is surrounded by coil 69 in circuit with a local source of energy 70 and an interrupter contact 71 which is adapted to be operated by the solenoid plunger 68. It will be seen by this construction that the core 68 will be drawn up into the coil 69 raising the spindle 69 and contact finger 55 until it comes in contact with its coacting contact 56. As the solenoid core 68 is raised it breaks the circuit of contact 69 and 71 and falls back again, the action being the same as the well-known vibrator electric bell. It will be seen that this will keep the contact arm 55 in a state of vibration, and during the intervals when the armature is in its lowest position the coil 50 will be free to rotate and will assume a position corresponding to the relative phase displacement of the current in the windings, and it will then be caused to intermittently close contact with its contact stud 56 to operate any device on the vehicle.

Of course it will be understood that the particular embodiment shown herein merely discloses one form of construction of the device and it is evident that other constructions may be employed without departing from the spirit of the invention.

What I claim is:—

1. In a system of train control, a trackway and a vehicle for travel thereon, a circuit on the vehicle, means for impressing alternating currents of commensurate frequencies upon the trackway, means whereby corresponding frequencies are caused to flow in the circuit on the vehicle, a second circuit on the vehicle, means for regeneratively producing a frequency in said second circuit from one frequency in the first circuit but of a corresponding frequency to another frequency in said first circuit, and means whereby controlling mechanism on the vehicle is controlled jointly by the frequencies in the first and second circuits.

2. In a system of train control, a trackway and a vehicle for travel thereon, a circuit on said vehicle, means for impressing alternating currents of commensurate frequencies upon the trackway, means whereby corresponding frequencies are caused to flow in the circuit on the vehicle and controlling apparatus on the vehicle adapted to be selectively operated in accordance with the phase relation of the frequencies in said circuit.

3. In a system of train control, a trackway and a vehicle for travel thereon, a circuit on said vehicle, means for impressing alternating currents of commensurate frequencies upon the trackway, means whereby corresponding frequencies are caused to flow in the circuit on the vehicle, means for transposing the period of one of said frequencies to the same period as another frequency in said circuit, and means whereby the two frequencies of the same period are caused to jointly actuate controlling apparatus on the vehicle.

4. In a system of train control, a trackway and a vehicle for travel thereon, a circuit on said vehicle, means for impressing alternating currents of commensurate frequencies upon the trackway, means whereby corresponding frequencies are caused to flow in the circuit on the vehicle, means for transposing the period of one of said frequencies to the same period as another frequency in said circuit, and means whereby the two frequencies of the same period are caused to selectively actuate controlling apparatus on the vehicle in accordance with the phase relation of the frequencies.

5. In a system of train control, a trackway and a vehicle for travel thereon, a circuit on said vehicle, means for impressing alternating currents of commensurate frequencies upon the trackway, means whereby corresponding frequencies are caused to flow in the circuit on the vehicle, amplifying means associated with said circuit, and controlling apparatus on the vehicle adapted to be selectively operated in accordance with the phase relation of the frequencies in said circuit.

6. In a system of train control, a trackway and a vehicle for travel thereon, a circuit on said vehicle, means for impressing alternating currents of commensurate frequencies upon the trackway, means whereby corresponding frequencies are caused to flow in the circuit on the vehicle, amplifying means associated with said circuit, means for transposing the period of one of said frequencies to the same period as another frequency in said circuit, and means whereby the two frequencies of the same period are caused to selectively actuate controlling apparatus on the vehicle in accordance with the phase relation of the frequencies.

7. In a system of train control, a trackway divided into blocks, a vehicle adapted to travel thereon, means associated with each block section for impressing alternating current upon the same, means at each block section for impressing a second alternating current thereon of a frequency commensurate with that of the first frequency, means associated with a block section for controlling the phase relation of the two frequencies in a block section in accordance with traffic conditions in advance, and means responsive to the phase relation of the frequencies for controlling travel of the vehicle along the trackway.

8. In a system of train control, a trackway divided into blocks, a vehicle adapted to travel thereon, means associated with each block section for impressing alternating current upon the same, means at each block section for impressing a second alternating current thereon of a frequency commensurate with that of the first frequency, means associated with a block section for controlling the phase relation of the two frequencies in a block section in accordance with traffic conditions in advance, a circuit on the vehicle, means whereby frequencies corresponding to those in the track section are caused to flow in the circuit on the vehicle, a second circuit on the vehicle, means for regeneratively producing a frequency in said second circuit from one frequency in the first circuit but of a corresponding frequency to another frequency in said first circuit, and means whereby controlling mechanism on the vehicle is controlled jointly by the frequencies in the first and second circuits.

9. In a system of train control, a trackway divided into blocks, a vehicle adapted to travel thereon, means associated with each block section for impressing alternating current upon the same, means at each block section for impressing a second alternating current thereon of a frequency commensurate with that of the first frequency, means associated with a block section for controlling the phase relation of the two frequencies in a block section in accordance with traffic conditions in advance, a circuit on the vehicle, means whereby frequencies corresponding to those in the track section are caused to flow in the circuit on the vehicle, and controlling apparatus on the vehicle adapted to be selectively operated in accordance with the phase relation of the frequencies in said circuit.

10. In a system of train control, a trackway divided into blocks, a vehicle adapted to travel thereon, means associated with each block section for impressing alternating current upon the same, means at each block section for impressing a second alternating current thereon of a frequency commensurate with that of the first frequency, means associated with a block section for controlling the phase relation of the two frequencies in a block section in accordance with traffic conditions in advance, a circuit on the vehicle, means whereby frequencies corresponding to those in the track section are caused to flow in the circuit on the vehicle, means for transposing the period of one of said frequencies to the same period as another frequency in said circuit, and means whereby the two frequencies of the same period are caused to selectively actuate controlling apparatus on the vehicle in accordance with the phase relation of the frequencies.

In testimony whereof, I have signed my name to this specification.

ELI J. BLAKE.